US010415702B2

(12) United States Patent
Nomura et al.

(10) Patent No.: US 10,415,702 B2
(45) Date of Patent: Sep. 17, 2019

(54) PARKING LOCK SYSTEM

(71) Applicant: HONDA MOTOR CO., LTD., Tokyo (JP)

(72) Inventors: Takuya Nomura, Wako (JP); Takao Ueno, Wako (JP); Shunji Kamo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 421 days.

(21) Appl. No.: 15/350,326

(22) Filed: Nov. 14, 2016

(65) Prior Publication Data

US 2017/0138474 A1 May 18, 2017

(30) Foreign Application Priority Data

Nov. 17, 2015 (JP) .................................. 2015-224487

(51) Int. Cl.
*F16H 63/34* (2006.01)

(52) U.S. Cl.
CPC ................................ *F16H 63/3425* (2013.01)

(58) Field of Classification Search
CPC .................................................. F16H 63/3425
See application file for complete search history.

(56) References Cited

U.S. PATENT DOCUMENTS

| | | | |
|---|---|---|---|
| 7,934,590 B2 | 5/2011 | Duhaime et al. | |
| 9,205,813 B2 * | 12/2015 | Yokota | ............... F16H 63/3416 |
| 9,409,551 B2 * | 8/2016 | Isomura | .................. B60T 1/005 |
| 2005/0205385 A1 * | 9/2005 | Reed | ..................... F16H 57/031 |
| | | | 192/219.5 |
| 2015/0219205 A1 * | 8/2015 | Ohtani | ............... F16H 57/0465 |
| | | | 192/219.4 |
| 2016/0223082 A1 | 8/2016 | Streng et al. | |

FOREIGN PATENT DOCUMENTS

| | | |
|---|---|---|
| CN | 101318325 A | 12/2008 |
| CN | 101775962 A | 7/2010 |
| CN | 201836362 U | 5/2011 |

(Continued)

OTHER PUBLICATIONS

Office Action dated Jun. 28, 2017, issued in counterpart Japanese Application No. 2015-224487, with machine translation. (4 pages).

(Continued)

*Primary Examiner* — Charles A Fox
*Assistant Examiner* — Ryan P Dodd
(74) *Attorney, Agent, or Firm* — Westerman, Hattori, Daniels & Adrian

(57) ABSTRACT

In a parking lock system, a link member that swings due to sliding of an operating shaft so as to make a perking lock operate and release the operation includes a counterweight for canceling out axial inertial force of the operating shaft. Therefore, even if the operating shaft attempts to slide in an axial direction with respect to a transmission case due to inertial force when a vehicle experiences sudden deceleration due to a frontal collision or sudden braking, mass of the counterweight resists the inertial force to thus prevent the link member from swinging, thereby making it possible to avoid a situation in which the parking lock is operated unintentionally.

2 Claims, 2 Drawing Sheets

(56) References Cited

FOREIGN PATENT DOCUMENTS

| | | |
|---|---|---|
| CN | 102581107 A | 7/2012 |
| CN | 103307276 A | 9/2013 |
| CN | 103573027 A | 2/2014 |
| CN | 103925361 A | 7/2014 |
| CN | 203743412 U | 7/2014 |
| CN | 104534087 A | 4/2015 |
| DE | 102013220396 A1 | 4/2015 |
| JP | 2000-258696 A | 9/2000 |
| JP | 2002-5236 A | 1/2002 |
| JP | 2015-40377 A | 3/2015 |
| JP | 2015-124881 A | 7/2015 |

OTHER PUBLICATIONS

Office Action dated Oct. 12, 2017, issued in counterpart Canadian Application No. 2948153. (4 pages).
Office Action dated Feb. 12, 2018, issued in counterpart Chinese Application No. 201610987209.0, with English translation. (13 pages).

* cited by examiner

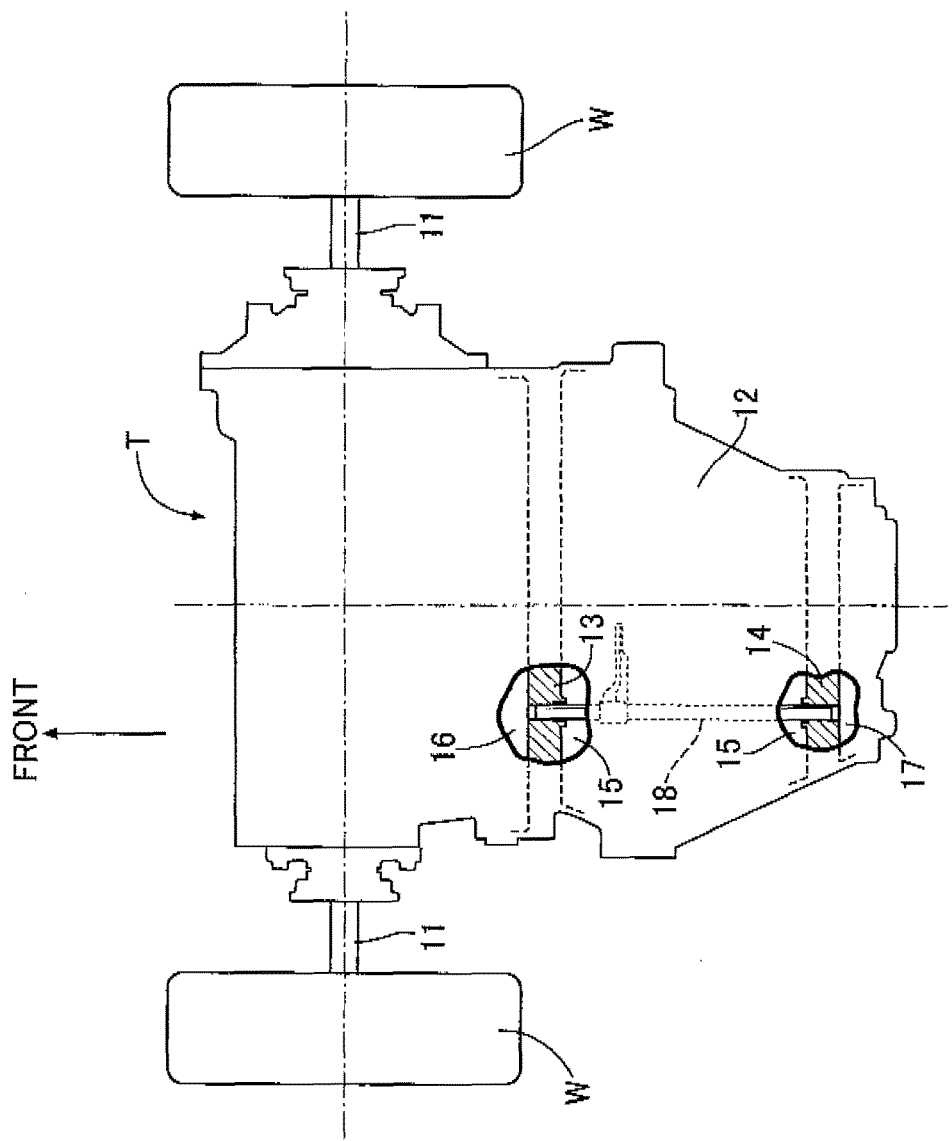

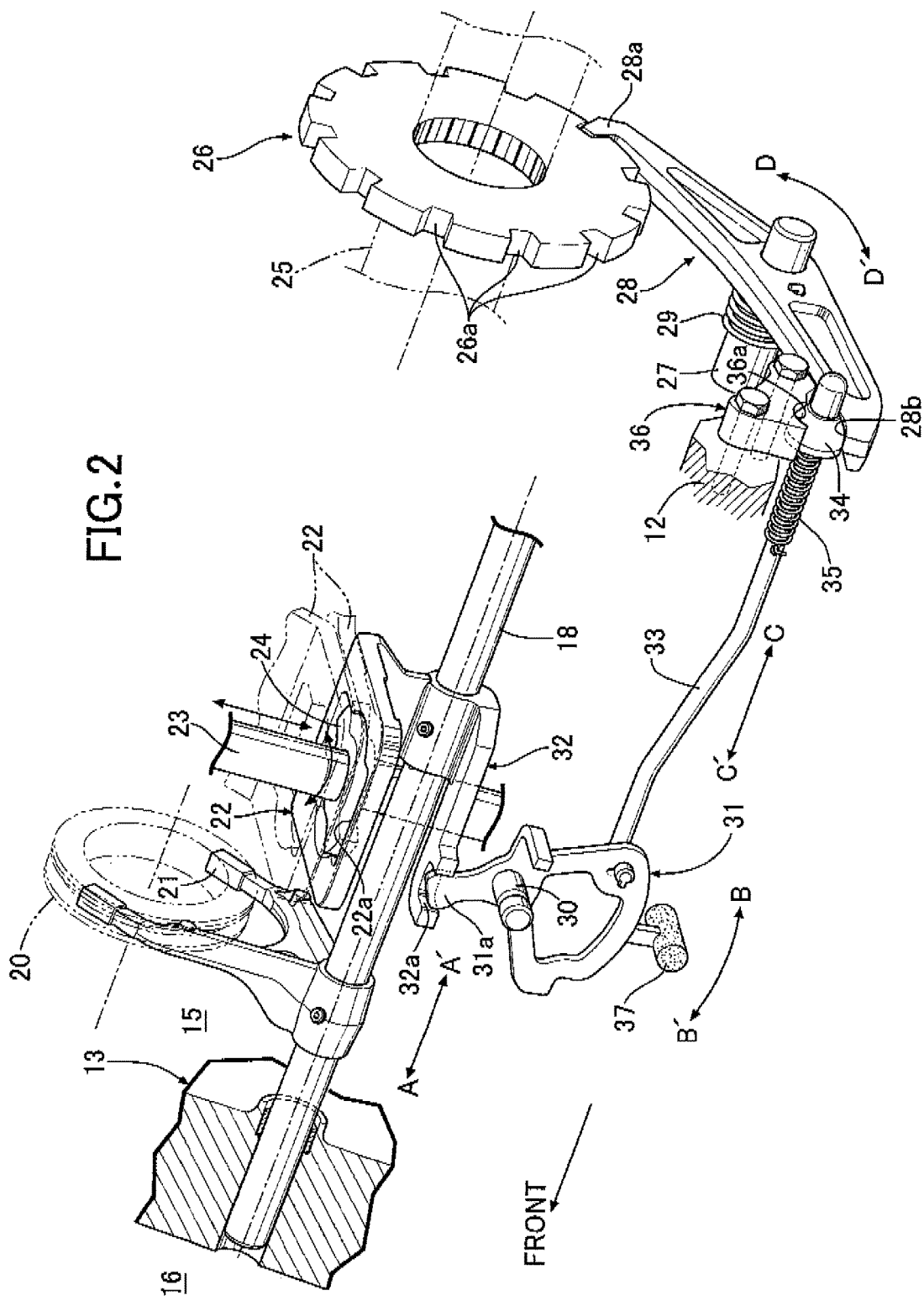

PARKING LOCK SYSTEM

BACKGROUND OF THE INVENTION

Field of the Invention

The present invention relates to a parking lock system comprising a rotating shaft that is rotatably supported on a transmission case and transmits driving force from a drive source to a driven wheel, a parking gear that is provided on the rotating shaft, an operating shaft that is axially slidably supported on the transmission case and has opposite end parts disposed at positions displaced in a fore-and-aft direction of a vehicle body, a link member that swings due to sliding of the operating shaft, and a parking pawl that engages with the parking gear by swinging of the link member and non-rotatably restrains the rotating shaft.

Description of the Related Art

In such a parking lock system, an operating shaft slides in an axial direction due to an inertial force in a fore-and-aft direction generated when a vehicle is involved in a collision or undergoes sudden braking, and Japanese Patent Application Laid-open No. 2015-124881 has made known an arrangement in which in order to prevent the parking lock system from suddenly operating, damping means for damping axial sliding of the operating shaft is provided on one end part of the operating shaft.

However, in the above arrangement, since the damping means for damping axial sliding of the operating shaft includes a first space housing the operating shaft, a second space separated from the first space via a partition wall, a support hole formed in the partition wall on the first space side and slidably supporting one end part of the operating shaft, a throttle hole providing communication between a base part of the support hole and the second space, and a variable volume chamber formed between said one end part of the operating shaft and the base part of the support hole, not only is it troublesome to set a diameter of a small throttle hole and machine it, but it is also necessary to employ a seal member for sealing the variable volume chamber, and there is thus a possibility that cost will increase.

SUMMARY OF THE INVENTION

The present invention has been accomplished in light of the above circumstances, and it is an object thereof to prevent, with a simple structure, a parking lock from being operated unintentionally by inertial force when a vehicle experiences sudden deceleration such as being involved in a frontal collision or undergoing sudden braking.

In order to achieve the object, according to a first aspect of the present invention, there is provided a parking lock system comprising a rotating shaft that is rotatably supported on a transmission case and transmits driving force from a drive source to a driven wheel, a parking gear that is provided on the rotating shaft, an operating shaft that is axially slidably supported on the transmission case and has opposite end parts disposed at positions displaced in a fore-and-aft direction of a vehicle body, a link member that swings due to sliding of the operating shaft, and a parking pawl that engages with the parking gear by swinging of the link member and non-rotatably restrains the rotating shaft, wherein the link member comprises a counterweight for canceling out axial inertial force of the operating shaft.

In accordance with the first aspect, the parking lock system includes the rotating shaft, which is rotatably supported on the transmission case and transmits the driving force from the drive source to the driven wheel, the parking gear, which is provided on the rotating shaft, the operating shaft, which is axially slidably supported on the transmission case and has opposite end parts disposed at positions displaced in the fore-and-aft direction of the vehicle body, the link member, which swings due to sliding of the operating shaft, and the parking pawl, which engages with the parking gear by swinging of the link member and non-rotatably restrains the rotating shaft.

Since the link member includes the counterweight for canceling out the axial inertial force of the operating shaft, even if the operating shaft attempts to slide in the axial direction with respect to the transmission case due to the inertial force when the vehicle experiences sudden deceleration due to a frontal collision or sudden braking, mass of the counterweight resists the inertial force to thus prevent the link member from swinging, thereby making it possible to avoid a situation in which the parking lock is operated unintentionally.

According to a second aspect of the present invention, in addition to the first aspect, the counterweight is formed from a vibration-absorbing rubber.

In accordance with the second aspect, since the counterweight is formed from a vibration-absorbing rubber, when an impact due to sudden deceleration of the vehicle is transmitted to the counterweight, the counterweight absorbs a vibrational energy, thereby suppressing occurrence of noise.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 1 is a plan view of a transmission of a vehicle.

FIG. 2 is a perspective view of a parking lock system.

DESCRIPTION OF THE PREFERRED EMBODIMENT

An embodiment of the present invention is explained below based on FIG. 1 and FIG. 2.

FIG. 1 is a plan view when a transmission T of a vehicle is viewed from above; the transmission T reduces the speed of the driving force from an engine, which is not illustrated, and drives left and right driven wheels W via left and right axles 11 extending on opposite sides in the vehicle width direction.

The interior of a transmission case 12 is partitioned into a first space 15 in the middle in the fore-and-aft direction, a second space 16 in front of the first space 15, and a third space 17 to the rear of the first space 15 by means of a front partition wall 13 and a rear partition wall 14 extending in the vehicle width direction, and an operating shaft 18 of a parking lock system housed within the first space 15 bridges between the front partition wall 13 and the rear partition wall 14 so that it can slide freely in the fore-and-aft direction. The operating shaft 18 is one of a plurality of shift rods of the transmission T.

As shown in FIG. 2, provided on an axially intermediate part of the operating shaft 18, which is a shift rod, are a shift fork 21 for operating a synchro device 20 that engages a shift gear of the transmission T with a gear shaft and disengages it therefrom, and a plate-shaped shift rail 22 for driving the operating shaft 18 in the axial direction. The transmission T includes the same number of shift rails 22 as there are synchro devices 20, the plurality of shift rails 22 being disposed so as to overlap each other. A shift/select rod 23 extending in the direction in which the shift rails 22 overlap each other includes a shift finger 24, and this shift finger 24 can engage with an inner face of cam holes 22a formed in the respective shift rails 22.

Therefore, after the shift/select rod 23 is moved in the axial direction by means of an actuator, which is not illustrated, and the shift finger 24 is engaged with the cam hole 22a of the desired shift rail 22, the shift/select rod 23 is rotated around its axis by means of the actuator, an inner face of the cam hole 22a is pushed to drive the desired shift rod (operating shaft 18) in the axial direction, and the synchro device 20 is operated by means of the shift fork 21, thus enabling a desired gear position to be established.

A parking gear 26 including a plurality of latching grooves 26a in an outer peripheral face is fixedly provided on a rotating shaft 25 forming an output shaft of the transmission T. A parking pawl 28 having an intermediate part swingably supported on a support shaft 27 is urged by means of a spring 29 in a direction in which a latching claw 28a provided at one end moves away from the latching grooves 26a of the parking gear 26.

A projecting portion 31a provided at one end of a link member 31 having an intermediate part pivotally supported on a support shaft 30 engages with a groove portion 32a provided at the extremity of an arm member 32 extending integrally with the shift rail 22. A parking rod 33 having one end pivotally supported at the other end of the link member 31 slidably supports a cone-shaped cam member 34 at the other end of the parking rod 33, and the cam member 34 is urged toward said other end side of the parking rod 33 by means of a spring 35. The cam member 34 is fitted between a fixed cam face 36a of a support member 36 fixed to the transmission case 12 and a movable cam face 28b formed at the other end of the parking pawl 28.

Therefore, in a state in which the shift/select rod 23 is moved in the axial direction and the shift finger 24 is engaged with the shift rail 22 of the operating shaft 18, rotating the shift/select rod 23 around the axis to thus slide the operating shaft 18 toward the parking position in an arrow A direction of FIG. 2 makes the link member 31 having the projecting portion 31a pressed against the groove portion 32a of the arm member 32 swing in an arrow B direction and drive the parking rod 33 in an arrow C direction. As a result, the cam member 34 is pushed in between the fixed cam face 36a of the support member 36 and the movable cam face 28b of the parking pawl 28, the parking pawl 28 swings in an arrow D direction to thus engage the latching claw 28a with one of the latching grooves 26a of the parking gear 26, and the rotating shaft 25 is non-rotatably restrained to thus make a parking lock operate.

Conversely to the above, if the operating shaft 18 is made to slide in an arrow A' direction by means of the shift/select rod 23, the link member 31 and the parking rod 33 move in an arrow B' and an arrow C' direction respectively, the parking pawl 28 is made to swing in an arrow D' direction by means of the resilient force of the spring 29, the latching claw 28a of the parking pawl 28 is disengaged from the latching groove 26a of the parking gear 26, the restraint of the rotating shaft 25 is thereby released, and the operation of the parking lock is released.

The link member 31 includes a counterweight 37, made from a vibration-absorbing rubber, on an opposite side of the projecting portion 31a with the support shaft 30 sandwiched between the projecting portion 31a and the counterweight 37.

The operation of the embodiment of the present invention having the above arrangement is now explained.

When the vehicle experiences sudden deceleration due to a frontal collision or sudden braking, a forward inertial force (arrow A direction in FIG. 2) acts on the operating shaft 18, which is disposed in the fore-and-aft direction. Since the shift fork 21 and the shift rail 22 are provided on the operating shaft 18, the mass increases by a portion corresponding thereto and the inertial force increases, and there is a possibility that the operating shaft 18 will slide in the arrow A direction and unexpectedly go into the parking position.

Although such a forward inertial force also acts on the link member 31 and the parking rod 33, since substantially the middle part of the main body part of the link member 31 excluding the counterweight 37 is pivotally supported by the support shaft 30, the forward inertial force acting on the main body part of the link member 31 does not make the link member 31 swing in a direction in which the operation of the parking lock is released. Furthermore, the forward inertial force acting on the parking rod 33 makes the link member 31 attempt to swing in a direction in which the operation of the parking lock is released, but since the mass of the parking rod 33, which has a small diameter, is much smaller than the mass of the operating shaft 18, which has a large diameter, the forward inertial force acting on the parking rod 33 is insufficient to cancel out the forward inertial force acting on the operating shaft 18.

In the present embodiment in particular, since a structure is employed in which the shift finger 24 of the shift/select rod 23 selectively engages with the cam hole 22a of the shift rail 22, when the shift finger 24 is engaged with the shift rail 22 provided on the operating shaft 18 there is a possibility that the engagement between the shift finger 24 and the shift rail 22 will prevent the operating shaft 18 from sliding in the arrow A direction, but when the shift finger 24 is not engaged with the shift rail 22 provided on the operating shaft 18, there is a high possibility that the operating shaft 18 will slide in the arrow A direction and go into the parking position.

In this way, due to the forward inertial force acting on the operating shaft 18, the operating shaft 18 slides in the arrow A direction and goes into the parking position, the link member 31 swings in the arrow B direction, the parking rod 33 moves in the arrow C direction, the parking pawl 28 swings in the arrow D direction to make the parking lock operate, and there is therefore a possibility that the driven wheels W will be locked and a large impact will be applied to the vehicle body and an occupant.

However, in accordance with the present embodiment, when the vehicle experiences sudden deceleration due to a frontal collision or sudden braking, the forward inertial force also acts on the counterweight 37 provided on the link member 31, and this inertial force makes the link member 31 attempt to swing in the arrow B' direction, which is the direction via which the operation of the parking lock is released; in other words it acts so as to prevent the operating shaft 18 from sliding in the arrow A direction, and the link member 31 is prevented from swinging in the arrow B direction, thereby making it possible to prevent the parking lock from being operated unintentionally.

In this process, in order to reliably prevent the link member 31 from swinging in the arrow B direction, which is the direction via which the parking lock operates, it is necessary to set the mass of the counterweight 37 so that the moment with which the inertial force acting on the parking rod 33 and the counterweight 37 makes the link member 31 swing in the arrow B' direction exceeds the moment with which the inertial force acting on the operating shaft 18 makes the link member 31 swing in the arrow B direction.

Moreover, since the counterweight 37 is formed from a vibration-absorbing rubber, when an impact due to sudden deceleration of the vehicle is transmitted to the counterweight 37, the counterweight 37 absorbs the vibrational energy, thereby suppressing the occurrence of noise.

An embodiment of the present invention is explained above, but the present invention may be modified in a variety of ways as long as the modifications do not depart from the gist of the present invention.

For example, in the embodiment the operating shaft 18 is disposed in the fore-and-aft direction, but the direction in which the operating shaft 18 is disposed is not limited to the fore-and-aft direction and may be a direction in which it is inclined at an angle other than 90° with respect to the fore-and-aft direction. That is, when the operating shaft 18 is disposed in the vehicle width direction or the up-down direction at an angle of 90° with respect to the fore-and-aft direction, even when an inertial force in the fore-and-aft direction acts on the operating shaft 18, it does not slide in the axial direction, and unexpected operation of the parking lock system therefore does not occur. As in the present embodiment, when the operating shaft 18 is disposed in the fore-and-aft direction, since all the components of the inertial force act on the operating shaft 18 so as to make it slide, the effects of the present invention are exhibited most effectively.

Furthermore, in the embodiment one of the plurality of shift rods is utilized as the operating shaft 18 of the parking lock system, but an operating shaft 18 may be provided for exclusive use in the parking lock system.

What is claimed is:

1. A parking lock system, comprising:
    a rotating shaft that is rotatably supported on a transmission case and transmits driving force from a drive source to a driven wheel of a vehicle,
    a parking gear that is provided on the rotating shaft,
    an operating shaft that is axially slidably supported on the transmission case and has opposite end parts disposed at positions displaced in a fore-and-aft direction of a vehicle body,
    a link member that swings due to sliding of the operating shaft,
    a parking rod that is operatively connected with the link member; and
    a parking pawl that engages with the parking gear by an operation of the parking rod following swinging of the link member and non-rotatably restrains the rotating shaft,
    wherein the link member comprises a counterweight for canceling out inertial force acting on the operating shaft in an axial direction of the operating shaft when the vehicle experiences sudden deceleration due to a frontal collision or sudden braking.

2. The parking lock system according to claim 1, wherein the counterweight is formed from a vibration-absorbing rubber.

\* \* \* \* \*